July 25, 1961  B. RESNICK  2,993,644
ALTITUDE COMPUTER
Filed March 27, 1958  2 Sheets-Sheet 1

INVENTOR,
BERNARD RESNICK
BY
*Harry M. Saragovitz*
ATTORNEY.

INVENTORS,
BERNARD RESNICK
BY
Harry M. Saragovitz
ATTORNEY

United States Patent Office 2,993,644
Patented July 25, 1961

2,993,644
ALTITUDE COMPUTER
Bernard Resnick, Wayland, Mass., assignor to the United States of America as represented by the Secretary of the Army
Filed Mar. 27, 1958, Ser. No. 724,488
5 Claims. (Cl. 235—186)

The present invention relates to an altitude computer and is described herein as being particularly adapted for use with an AN/GMD–1A Rawin Set.

The AN/GMD–1A Rawin Set is a transportable radio direction finder designed to track a balloon-borne radiosonde transmitter automatically. The AN/GMD–1A Rawin Set, a meteorological recorded (wherein the meteorological data-pressure, temperature, and humidity as received from the Rawin Set is printed), and a radiosonde transmitter, constitute a "rawinsonde" system. The rawinsonde system is used to make atmospheric soundings. This is accomplished by measuring wind speed, wind direction, pressure temperature, and humidity throughout the vertical extent of the sounding. These measurements are used for the analysis and forecasting of weather conditions, the guidance and planning of the navigation of aircraft, and the preparation of ballistic corrections for the effect of the atmosphere on the trajectory of projectiles, missiles and rockets.

The Rawin Set AN/GMD–1A automatically tracks the balloon-borne radiosonde to altitudes of 100,000 feet or more, and to horizontal distances of about 125 miles, depending on the surrounding terrain. The purpose of the control recorder unit of the Rawin Set AN/GMD–1A is to compute and record in printed form the position of a radiosonde balloon as indicated by the Rawin Set. To fulfill this function, the control recorder of this invention must produce printed records of the time elapsed since balloon release, slant range, elevation, azimuth and altitude above sea level.

Elapsed time is obtained from a timer in the control recorder. Range, elevation, and azimuth are transmitted to the control recorder from the Rawin Set as synchro signals, but altitude must be computed within the control recorder. In the prior art control unit the altitude was computed from the temperature and pressure data. It is important that the azimuth and elevation angles as well as the altitude be correct since they are used to determine wind direction and wind speed. It has been found in the prior art control unit that, under conditions of very high altitudes and strong mean winds, further increases in accuracy are desired. Further, an experimental and theoretical analysis of the prior art system indicates that it is not readily adapted to automatic processing of data. This is primarily due to difficulties in commutating the temperature and humidity information into the proper computer channels since the rate of switching is a function of the pressure instrument "baroswitch" calibration and the rate of rise of the balloon-borne assembly.

The system as disclosed herein is designed to improve the accuracy of wind determinations, reduce the operational limitations, and at the same time secure reliable automatic data processing. This system employs a range-measuring technique (rather than height measuring as used in the prior art pressure systems) to secure the wind determination accuracy at the long ranges which result from high winds.

In the present invention altitude is computed by analog means using range and elevation angle data. This data is transmitted to the control recorder in the form of synchro voltages. These synchro voltages operate synchros and servos which, in turn, control the slider arms of a variable resistor and a group of potentiometers so that the final output from the potentiometers will indicate altitude in accordance with the following equation:

$$H = R \sin E + \frac{R^2 \cos^2 E}{2R_e}$$

where $R$ is the slant range, $E$ is the angle of elevation, and $R_e$ is the earth's radius.

The second term in above equation is the correction for the earth's curvature.

An object of the present invention is to provide, a simple, inexpensive altitude computing means.

Another object of the present invention is the provision of a simplified altitude computing means for use in a rawinsonde system.

A further object of the present invention is the provision of means for computing altitude from slant range and elevation angle information including a means to correct for the curvature of the earth.

The exact nature of this invention as well as other objects and advantages thereof will be readily apparent from consideration of the following specification in conjunction with the annexed drawings, in which.

Figure 1:
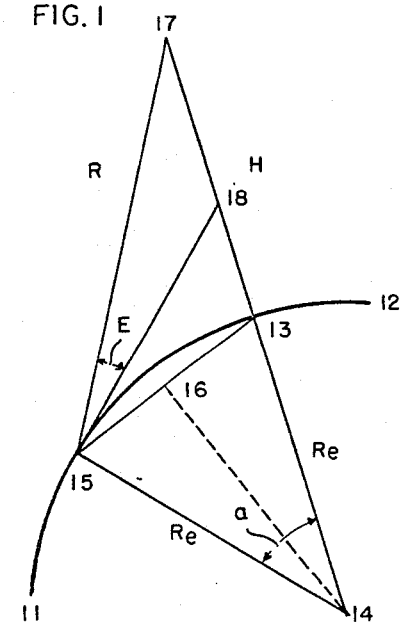
FIGURE 1 is a geometric drawing used for deriving the equation for altitude.

Referring now to the drawings in detail, there is shown in FIGURE 1 a geometric drawing used in determining the equation for altitude. The Rawin receiver is located at 15. The arc 11—12 represents a portion of the surface of the earth, $R_e$ represents the earth's radius, angle "a" represents the angle subtended, R represents the slant range, E represents the elevation angle, and H represents the altitude corrected for the curvature of the earth.

Lines 13—14 ($R_e$) and 14—15 ($R_e$) form angle (a) and two sides of a triangle; the third side of the triangle is cord 13—15. Dashed lines 14—16 is the perpendicular bisector of cord 13—15. Line 13—17 represents altitude (H) and is a continuation of straight line 13—14 ($R_e$); line 15—17 (R) is a line representing the slant range and line 15—18 is tangent to 11—12 at 15. Elevation angle (E) is formed by lines 15—17 (R) and 15—18.

Since triangle 13—14—15 is an isosceles triangles, triangles 13—14—16 and 15—14—16 are right triangles having right angles 14—16—13 and 14—16—15, respectively. Therefore angles 16–13—14 and 16—15—14 $= 90° - a/2$.

Since angle 18—15—14 is a right angle, from geometry, angle 18—15—16 $= a/2$.

Since angle 14—13—18 is a straight angle, from geometry, angle 18—13—15 $= 90° + a/2$.

Using the law of sines:

$$\frac{H}{\sin\left(E+\frac{a}{2}\right)} = \frac{R}{\sin\left(90°+\frac{a}{2}\right)}, \quad H = \frac{R \sin\left(E+\frac{a}{2}\right)}{\cos\frac{a}{2}} \quad (1)$$

Approximation No. 1: Since $0 \leq a \leq 2°$, $$\cos\frac{a}{2} \cong 1$$

Therefore:

$$H \cong R \sin\left(E+\frac{a}{2}\right) \quad (2)$$

Expanding the above expression, $$H \cong R \sin E \cos \frac{a}{2} + R \cos E \sin \frac{a}{2} \quad (3)$$

Using approximation No. 1 in Equation 3

$$H \cong R \sin E + R \cos E \sin \frac{a}{2} \quad (4)$$

$$\tan a = \frac{R \cos E}{(R_e + R \sin E)} \quad (5)$$

Approximaton No. 2: Since $0 \leq a \leq 2°$, $\tan a = a$ $$a \cong \frac{R \cos E}{(R_e + R \sin E)} \quad (6)$$

Therefore:

$$\frac{a}{2} \cong \frac{R \cos E}{2(R_e + R \sin E)} \quad (7)$$

Since $$R_e \geq \geq R \sin E, \quad R_e + R \sin E \cong R_e \quad (8)$$

Therefore:

$$\frac{a}{2} \cong \frac{R \cos E}{2 R_e} \quad (9)$$

Approximation No. 3: Since $$0 \leq \frac{a}{2} \leq 1°, \sin \frac{a}{2} \cong \frac{a}{2}$$

Therefore using approximation No. 3 in Equation 4

$$H \cong R \sin E + R \cos E \left(\frac{a}{2}\right) \quad (10)$$

Substituting Equation 9 in Equation 10

$$H \cong R \sin E + \frac{R \cos E \cdot R \cos E}{2 R_e} \quad (11)$$

$$H \cong R \sin E + \frac{R^2 \cos^2 E}{2 R_e} \quad (12)$$

The error introduced into the system by making the above approximations is always positive, that is, the correct answer is smaller than the computed answer.

Figure 2:
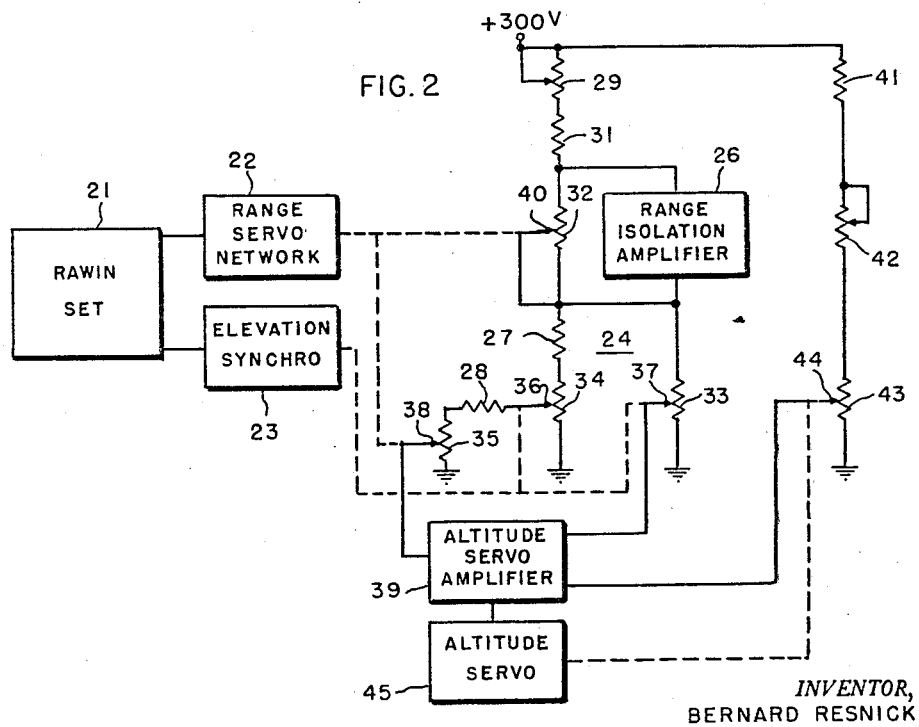
FIGURE 2 is the circuit diagram of the invention, partly in schematic form and partly in block form.

The circuit of FIGURE 2 comprises a range servo network 22 and an elevation synchro 23 electrically connected to a Rawin Set 21 for receiving range and elevation synchro signals, respectively, therefrom. Elevation synchro 23 drives a set of printer indicator wheels (not shown), permitting the elevation to be read directly. The range information is low-powered and must be amplified before it can be utilized to drive the range printer indicator wheel. Thus a range servo network 22 is used in place of a direct synchro. Elevation synchro 23 and range servo network 22 are also mechanically connected to a computer network 24 through the slider arms of a variable resistor and the potentiometers forming the computer network, the output therefrom being a voltage proportional to the altitude as given by Equation 12 above.

Computer network 24 comprises a direct current source of voltage (+300), a range isolation amplifier 26, fixed resistors 27 and 28 to give the dividing factor $$\frac{1}{2 R_e}$$

as given in Equation 12 above, a variable voltage dropping resistor 29, resistor 31, variable resistor (range resistor) 32, and three potentiometers—sine potentiometer 33, $\cos^2 E$ potentiometer 34 and range squared ($R^2$) potentiometer 35. This latter potentiometer, while being called a range-squared potentiometer, is not calibrated to be actually proportional to the range squared. It is calibrated to be proportional to range and cooperates with range resistor 32 to give an output voltage proportional to the range squared.

Range resistor 32, which delivers an output representative of the distance R as shown in FIGURE 1, and range isolation amplifier 26 are connected in parallel, one end of the resistor being connected through resistor 31 in series with variable voltage dropping resistor 29 to +300 volt direct current source, and the other end thereof being connected through sine potentiometer 33 to ground. In parallel with sine potentiometer 33 is resistor 27 connected in series with $\cos^2 E$ potentiometer 34.

Slider arm 36 and slider arm 37 of $\cos^2 E$ potentiometer 34 and sine potentiometer 33, respectively, are mechanically connected (shown as dashed lines in FIGURE 2) to elevation synchro 23 by a shaft or the like so that when a synchro signal is applied to elevation synchro 23 the positions of slider arms 36 and 37 are changed. Slider arm 36 is electrically connected through resistor 28 in series with range squared ($R^2$) potentiometer 35 to ground.

Slider arms 38 and 37 of range squared potentiometer 35 and sine potentiometer 33, respectively, are electrically connected to altitude servo amplifier 39 wherein the voltages applied thereto are summed.

Slider arms 38 and 40 are mechanically connected, as shown by dashed lines, to range servo network 22 by a shaft or the like and are positioned thereby when a synchro signal is applied to range servo network 22.

Dropping resistor 41, variable resistor 42, and follow-up potentiometer 43 are connected in series between the +300 volt direct current source and ground. Slider arm 44 of follow-up potentiometer 43 is electrically connected to altitude servo amplifier 39 and mechanically connected, as shown by dashed line to altitude servo 45 by a shaft or the like. Altitude servo 45, which is electrically connected to altitude servo amplifier 39 and receives electrical information therefrom, drives a set of printer wheels (not shown) directly in accordance with the information received and allows the altitude to be read directly. Servo 45 also drives a synchro transmitted (not shown) which feeds information to a meteorological data computer.

The altitude computer network 24 operates as follows:

Range and altitude information is fed to altitude computer network 24 via mechanical coupling of the slider arms of the variable resistor and potentiometers to the range servo network 22 and elevation synchro 23. Thus, synchro signals applied to range servo network 22 and elevation synchro 23 from Rawin Set 21 result in positioning the slider arms of the variable resistor and potentiometers of the altitude computer network 24. When range slider arm 40 of range resistor 32 is positioned by range servo network 22, a voltage proportional to range is applied to the resistance element of sine potentiometer 33, the slider arm 37 of which is positioned by the elevation synchro. The output voltage from slider arm 37 is applied to altitude servo amplifier 39 and is proportional to the $R \sin E$ term in Equation 12 above. The range voltage applied to sine potentiometer 33 is obtained from range isolation amplifier 26, which utilizes range resistor 32 as a feedback path. Such an arrangement eliminates all loading of range resistor 32 and increases accuracy since maximum linearity can be achieved. With a +300 volt direct current source, the output of range isolation amplifier 26, applied to sine potentiometer 33, will vary linearly with the setting of slider arm 40 of range resistor 32, and the range isolation amplifier output impedance will be very low.

Figure 3:
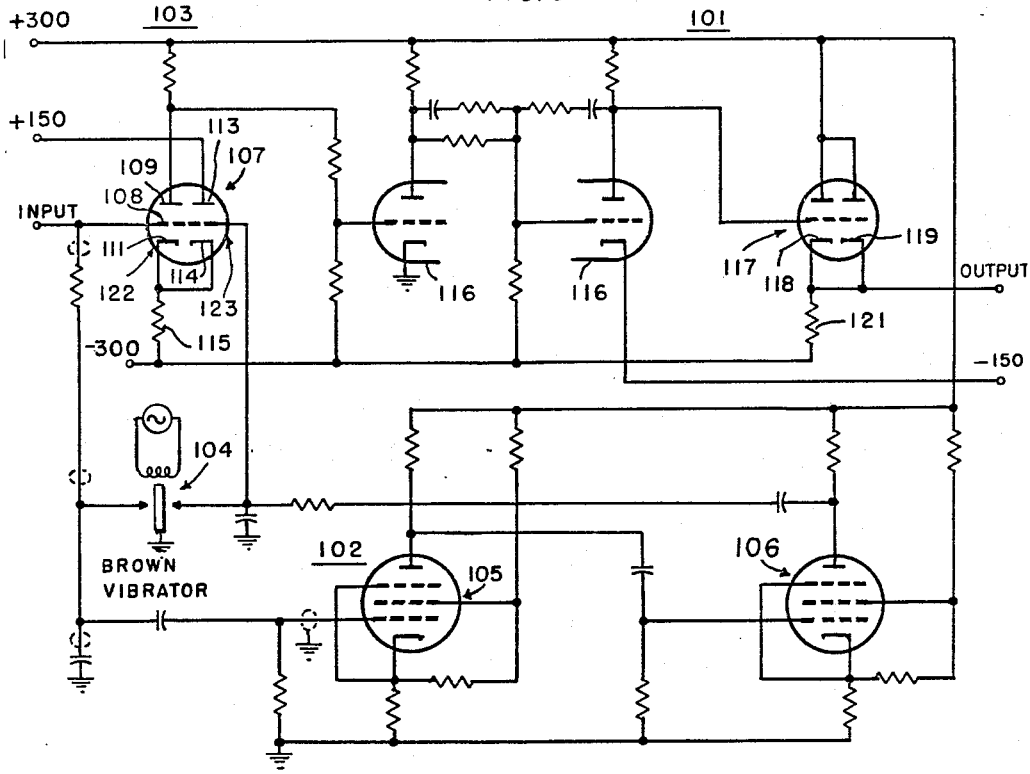
FIGURE 3 is a preferred embodiment of the range isolation amplifier shown in FIGURE 2.

Range isolation amplifier 26, as depicted in FIGURE 3, comprises essentially three sections—a direct current amplifier section 101, a modulator-demodulator section 102, and a difference-function section 103. The modulator-demodulator section 102 comprises a Brown Vibrator (chopper) 104 and two conventional alternating current amplifiers 105, 106. The difference-function section 103 is a dual-triode 107, comprising a first triode 122 having grid 108, plate 109, and cathode 111, and a second triode 123 having grid 112, plate 113, and cathode 114. Cathodes 111 and 114 are connected in common through cathode resistor 115 to a —300 volt direct current source. Direct current amplifier section 101 comprising a dual-triode direct current amplifier 116 and a dual-triode cathode-follower 117. Cathodes 118 and 119 of cathode follower 117 are connected through common cathode resistor 121 to a —300 volt direct current source.

Brown Vibrator 104, which performs the modulation and demodulation functions, comprises essentially a reed driven at 60 cycles per second which makes and breaks contact with two contact points on either side of its swing.

Input information is applied through variable voltage dropping resistor 29 and resistor 31, as shown in FIGURE 2, simultaneously to chopper 104 and grid 108. Chopper 104 modulates this information, which is substantially a slowly varying voltage, with a 60 cycle per second square wave. This modulated voltage is then applied to, and amplified by, amplifiers 105 and 106. The output from amplifier 106 is then demodulated by chopper 104 to a voltage equal to the increased magnitude of the square waves. The demodulated output voltage is applied to grid 112 of triode 123 of difference-function section 103 where it is compared with the amplitude of the voltage applied to grid 108.

Since cathodes 111 and 114 are connected in common with resistor 115, the effective signal input to grid 108 is dependent upon the grid-to-ground voltage of both triodes 122 and 123. Any positive signal on grid 112 results in an increase in the cathode voltage of dual-triode 107 since the plate current flow through triode 123 increases. Conversely, a negative grid-to-ground voltage on triode 123 increases the grid-to-cathode voltage of triode 122. The grid-to-cathode voltage of triode 122 also depends upon the magnitude of the grid-to-ground voltage (signal) at grid 108 and is of the same polarity. Thus the grid-to-cathode voltage of triode 122, which is dependent upon the difference between the grid-to-ground voltages of the two sections of dual-triode 107, determines the plate voltage applied to direct current amplifier 116 from plate 109.

The output signal from amplifier 116 is applied to cathode follower 117. It determines the output developed across common cathode resistor 121 and applied to sine potentiometer 33, as shown in FIGURE 2.

The effective direct-current gain of the modulator-demodulator section 102 is about 1000, and the gain of direct current amplifier section 101 is about 20,000. Hence, the composite range isolation amplifier 26 exhibits an overall gain of $20 \times 10^6$ for direct current amplification. Because of the characteristic of the modulator-demodulator section 102 and the compensating network in the direct current path, this gain decreases to unity at about 1000 cycles per second. The gain and phase-versus-frequency characteristic are so adjusted that instability will not occur for any magnitude of feedback through range resistor 32.

The tube filaments of the tubes of range isolation amplifier 26 should be allowed to warm up before the other supply voltages are turned on. Also, care must be taken to turn both positive and negative voltages on at the same time. Without these precautions the tubes can easily be driven out of their linear range and voltage transients may harm the modulator contacts. Moreover, if the transients are too large, the tubes in the direct current amplifier may be either saturated or cut off in such a manner that the output will stick at some value other than that determined by the feedback circuit. To avoid these difficulties, the amplifier power supply is equipped with a time delay relay (not shown) which allows the filaments to warm up before switching on the other supply voltages.

The range signal applied to sine potentiometer 33 is also simultaneously applied to $\cos^2 E$ potentiometer 34 through resistor 27. Slider arm 36 of $\cos^2 E$ potentiometer 34 is mechanically positioned by elevation synchro 23 simultaneously with slider arm 37 of sine potentiometer 33. The voltage on slider arm 36 of $\cos^2 E$ potentiometer 34 is applied through resistor 28 to linear range-squared potentiometer 35, slider arm 38 thereof being positioned by range servo 22 simultaneously with the positioning of slider arm 40 of range resistor 32. Resistors 27 and 28 account for the $$\frac{1}{2R_e}$$

factor of Equation 12. Thus the voltage on slider arm 38 represents the earth's curvature correction term $$\frac{R^2 \cos^2 E}{2R_e}$$

of Equation 12 above. This voltage is applied to altitude servo amplifier 39 and is added therein to the voltage representing the $R \sin E$ term of Equation 12 applied from slider arm 37.

The output from altitude servo amplifier 39 is applied to altitude servo 45 which is mechanically coupled to and drives an altitude indicator (not shown). This altitude servo 45 is also mechanically coupled to slider arm 44 of follow-up potentiometer 43. Follow-up potentiometer 43 feeds back electrical altitude follow-up information to altitude servo amplifier 39 which is subtracted from the other electrical information applied thereto from computer network 24. Follow-up potentiometer 43 is necessary since the voltage therefrom applied through slider arm 44 will cancel out the voltage derived from computer network 24 after the output shaft of altitude servo 45 is positioned correctly according to the altitude information signal received. Thus, the signal derived from slider arm 44 of follow-up potentiometer 43 results in the output shaft of altitude servo 45 being locked in its correct position. This is necessary since the altitude printer indicator and a transmitter synchro (for sending altitude information to other equipment) are geared to the output shaft of altitude servo 45.

Resistor 41 and potentiometer 42 are used as dropping resistors so that follow-up potentiometer 43 will have a full 24 volts direct current thereacross, i.e., range of 24 volts. The follow-up potentiometer 43 is so designed that the full range of 24 volts thereacross will be equivalent to 120,000 feet altitude (this being the maximum altitude that the control recorder is capable of recording). For every volt decrease from full scale there will be an equivalent decrease in altitude of 5,000 feet until at zero voltage the equivalent altitude will be zero feet. Thus, when a balloon whose altitude is to be determined is on the ground, the output voltage from follow-up potentiometer 43 will be zero volts. As the baloon increases in altitude from zero feet to its maximum value of 120,000 feet slider arm 44 will move so that more and more voltage is applied back to altitude servo amplifier 39. Finally, when the balloon reaches the maximum altitude of 120,000 feet, follow-up potentiometer 43 will supply its full scale voltage of 24 volts direct current to servo amplifier 39. Thus, it can be seen that the voltage derived from slider arm 44 of folow-up potentiometer 43 will be at a value equal to the sum of the voltage derived from slider arm 38 of range-squared potentiometer 35 and from slider arm 37 of sine potentiometer 33 after altitude servo 45 is positioned, this being accomplished by the mechanical positioning of slider arm 44 of follow-up potentiometer 43 by altitude servo 45.

One of the component parts of altitude servo 45 is an alternating current (A.C.) motor 58. Since the voltage signals equivalent to the $R \sin E$ and $$\frac{R^2 \cos^2 E}{2R_e}$$

terms, and that equivalent to the altitude (H) follow-up voltage, are direct current (D.C.) voltage, they therefore have to be converted from D.C. to suppressed-carrier modulated A.C. by altitude servo amplifier 39 in order that the altitude servo motor 58 can be driven thereby.

Figure 4:
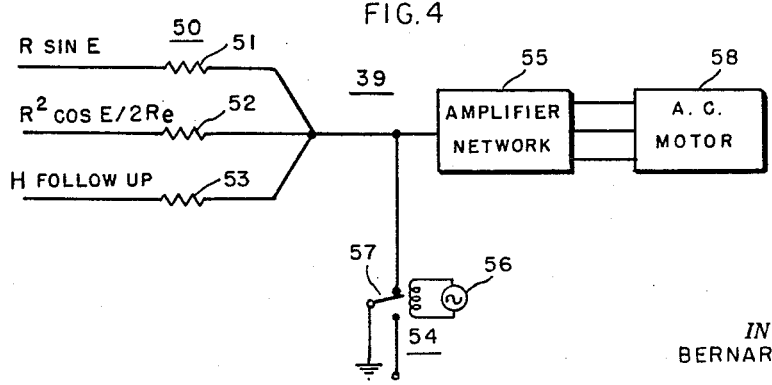
FIGURE 4 is a preferred embodiment of the altitude servo amplifier shown in FIGURE 2.

As shown in FIGURE 4, the voltage signals equivalent to the $R \sin E$, $$\frac{R^2 \cos^2 E}{2R_e}$$

and H follow-up terms are applied to resistors 51, 52, and 53, respectively, of summing circuit 50. The output from summing circuit 50 is applied simultaneously to chopper (synchronous converter) 54 and to amplifier network 55. A.C. voltage source 56 supplies a reference voltage at 60 cycles per second to converter 54 allowing converter contact 57, grounded at one end, to ground the input (the output from summing circuit 50) to the first stage of amplifier network 55 on every positive half cycle of the 60 cycles per second reference voltage. Thus, an approximately square-wave signal, having a frequency of 60 cycles per second is applied to a grid of a first amplifier stage of amplifier network 55. The signal is amplified in the succeeding stages of amplifier network 55 and finally applied to the field of A.C. motor 58 through a push-pull power stage of amplifier network 55.

It can be seen from the above description that altitude information can be easily computed and utilized by the operation of a potentiometer-computer network in which mechanical positioning of the slider arms of the potentiometers can be accurately accomplished by driving means operated by both range and elevation signal information.

The foregoing disclosure relates only to a preferred embodiment of the invention. Numerous modifications or alterations may be made therein without departing from the spirit and the scope of the invention as set forth in the appended claims.

What is claimed is:

1. An apparatus for computing the altitude of an object comprising a means for receiving range and elevation information from said object; a range isolation amplifier; a variable range resistor connected electrically in parallel with said range isolation amplifier, said range resistor constituting a feedback path for said range isolation amplifier and having a potential applied thereto; means connected to said receiving means for mechanically positioning the slider arm of said range resistor according to said range information; a sine potentiometer; an earth's curvature correction means connected to said receiving means, said range isolation amplifier having an output applied simultaneously to said sine potentiometer and to said earth's curvature correction means; means connected to said receiving means for mechanically positioning the slider arm of said sine potentiometer according to said elevation information; summing means, said earth's curvature correction means comprising potentiometers having slider arms positioned according to said range and elevation information, said sine potentiometer and said earth's curvature correction means connected to said summing means and having their outputs combined in said summing means to provide an output proportional to the altitude of said object an altitude servo network for receiving said combined outputs as first electrical information; and a follow-up circuit having an output electrically coupled to the input of said altitude servo network for applying a second electrical information thereto, said follow-up circuit including mechanical circuit-control means, said altitude servo having an output shaft mechanically coupled to said control means of said follow-up circuit, whereby said output shaft rotates according to said first electrical information and is locked in position when said second electrical information is equal in amplitude and opposite in polarity to said first electrical information.

2. The apparatus of claim 1 which further comprises a source of potential and wherein said follow-up circuit, including said mechanical control means, comprises a follow-up potentiometer having a slider arm mechanically positioned by said output shaft of said altitude servo network, said source of potential being applied across said follow-up potentiometer, said slider arm supplying said second electrical information to said servo network.

3. An apparatus for computing the altitude of an object comprising means for receiving range and elevation information as electrical data from said object; a range servo network connected to said receiving means for indicating said range information; an elevation synchro connected to said receiving means for indicating said elevation information; a range isolation amplifier; a variable range resistor electrically connected in parallel with said range isolation amplifier and acting as a feedback path therefor, said range isolation amplifier having an output, said variable range resistor having a slider arm mechanically positioned by said range servo network; a source of potential connected to said range resistor; a sine potentiometer and an earth's curvature correction means connected in parallel and coupled to said output of said range isolation amplifier to receive an electrical output therefrom, said sine potentiometer having a slider arm mechanically positioned by said elevation synchro, said earth's curvature correction means including a first resistor to receive said output from said range isolation amplifier, a cosine-squared potentiometer electrically connected to said first resistor, a second resistor electrically connected to the slider arm of said cosine-squared potentiometer, said slider arm of said cosine-squared potentiometer being positioned by said elevation synchro, a range-squared potentiometer electrically connected to said second resistor and having a slider arm positioned by said range servo network, said slider arm of said range-squared potentiometer having an electrical output representing the earth's curvature correction; an altitude servo amplifier to receive said electrical output from said slider arm of said range-squared potentiometer and the electrical output from said sine potentiometer; and an altitude servo having applied thereto the electrical output from said altitude servo amplifier.

4. The apparatus of claim 3 further comprising a follow-up potentiometer having an input electrically connected to said source of said potential and a slider arm mechanically positioned by said altitude servo and electrically connected to the input of said altitude servo amplifier.

5. An apparatus for computing the altitude of an object comprising means for receiving from said object range and elevation information as electrical data; a range servo network connected to the receiving means for indicating said range information; an elevation synchro connected to said receiving means for indicating said elevation information; a range isolation amplifier; a variable range resistor electrically connected in parallel with said range isolation amplifier and acting as a feedback therefor; a source of potential connected to the input of said range resistor, a sine potentiometer connected to said range resistor, said range servo network mechanically positioning the slider arm of said range resistor and thereby causing a voltage proportioned to range to be applied to said sine potentiometer, said sine potentiometer having its slider arm mechanically positioned by said elevation synchro and having an output voltage therefrom proportional to $R$ sine $E$, where R is range and E is elevation; a cosine-squared potentiometer; a first resistor for coupling said range resistor to said cosine-squared potentiometer; a range-squared potentiometer; a second resistor for coupling the output from the slider arm of said cosine-squared potentiometer to the input of said range-squared potentiometer, said cosine-squared potentiometer having its slider arm mechanically positioned by said elevation synchro, said range-squared potentiometer having its slider arm mechanically positioned by said range servo network and having an output voltage therefrom proportional to $$\frac{R^2 \cos^2 E}{2R_e}$$

where $R_e$ is the earth's radius, said first and second resistors accounting for the $$\frac{1}{2R_e}$$

factor, said $$\frac{R^2 \cos^2 E}{2R_e}$$

being a term representing a correction for the earth's curvature; a summing means connected to said slider arm of said sine potentiometer and to said slider arm of said range-squared potentiometer to receive the output voltages therefrom; an altitude servo amplifier connected to said summing means and having an output voltage proportional to $$R \sin E + \frac{R^2 \cos^2 E}{2R_e}$$

the latter voltage being proportional to the altitude of said object; an altitude servo having applied thereto the electrical output from said altitude servo amplifier and indicating the altitude of said object; a follow-up potentiometer having an input electrically connected to said source of potential and a slider-arm mechanically positioned by said altitude servo and electrically connected to the input of said altitude servo amplifier, whereby said follow-up potentiometer's output functions to control the mechanical operation of said altitude servo.

References Cited in the file of this patent

UNITED STATES PATENTS

| | | |
|---|---|---|
| 2,390,374 | Jordan et al. | Dec. 4, 1945 |
| 2,444,771 | Tyler | July 6, 1948 |

OTHER REFERENCES

Electronic Analog Computer by Korn and Korn, McGraw-Hill, 1952, New York (page 121 relied on).

Product Engineering, September 1953, "Servo Systems for Performing" by E. Wall (pp. 134–136 relied on).